United States Patent [19]

Eidemanis et al.

[11] Patent Number: 5,398,616
[45] Date of Patent: Mar. 21, 1995

[54] AUTOMATIC RAIL FASTENER APPLICATOR

[75] Inventors: Gunars Eidemanis, Franklin; Jack K. Hosking, Waukesha; Bruce M. Boczkiewicz, Mukwonago; William D. Straub, Milwaukee, all of Wis.

[73] Assignee: Oak Industries, Inc., Waltham, Mass.

[21] Appl. No.: 103,056

[22] Filed: Aug. 6, 1993

[51] Int. Cl.6 .......................................... E01B 29/00
[52] U.S. Cl. .................................... 104/17.2; 81/57.37
[58] Field of Search ............................. 104/17.1, 17.2; 173/184; 81/57.37, 430, 433, 435

[56] References Cited

U.S. PATENT DOCUMENTS

| 891,700 | 6/1908 | Jacobs . | |
|---|---|---|---|
| 910,201 | 1/1909 | Jenkins . | |
| 953,668 | 3/1910 | Kendrick . | |
| 956,856 | 5/1910 | Jacobs . | |
| 975,042 | 11/1910 | Jacobs . | |
| 1,060,173 | 4/1913 | Edwards . | |
| 1,072,618 | 9/1913 | Kendrick . | |
| 1,670,007 | 5/1928 | Rasmussen . | |
| 1,995,168 | 3/1935 | Bronander . | |
| 2,021,170 | 11/1935 | Bronander . | |
| 2,266,302 | 12/1941 | Blair | 81/57.37 |
| 2,591,005 | 4/1952 | Piper | 104/17.1 |
| 2,973,021 | 2/1961 | Crossen | 81/430 |
| 3,064,428 | 11/1962 | Plasser et al. . | |
| 3,294,130 | 12/1966 | Dorrer | 81/430 |
| 3,759,334 | 9/1973 | Theurer . | |
| 3,762,333 | 10/1988 | Theurer et al. . | |
| 4,062,388 | 12/1977 | DeCaro | 81/57.37 |
| 4,256,040 | 3/1981 | Dieringer | 104/17.1 |
| 4,416,172 | 11/1983 | Medinger | 81/57.37 |
| 4,442,738 | 4/1984 | Spencer | 87/57.37 |
| 4,674,367 | 6/1987 | Aab et al. | 81/57.37 |
| 4,777,885 | 10/1988 | Dieringer . | |
| 5,088,359 | 2/1992 | Hockman | 81/433 |
| 5,191,840 | 3/1993 | Cotic et al. . | |

FOREIGN PATENT DOCUMENTS

| 0153772 | 9/1985 | European Pat. Off. | 104/17.2 |
|---|---|---|---|
| 2406029 | 6/1979 | France | 104/17.2 |
| 0619967 | 5/1961 | Italy | 81/433 |
| 0241489 | 4/1969 | U.S.S.R. | 104/17.1 |
| 1472550 | 4/1989 | U.S.S.R. | 104/17.2 |
| 1687697 | 10/1991 | U.S.S.R. | 104/17.2 |

*Primary Examiner*—Mark T. Le
*Attorney, Agent, or Firm*—Greer, Burns & Crain, Ltd.

[57] ABSTRACT

An automatic fastener applicator for securing fasteners to track support members of a railroad track includes a retaining apparatus for receiving and orienting at least one of the fasteners for application to the track support members, and a drive apparatus for automatically engaging at least one of the oriented fasteners and for rotating the fastener axially for engagement upon the rail support members.

20 Claims, 6 Drawing Sheets

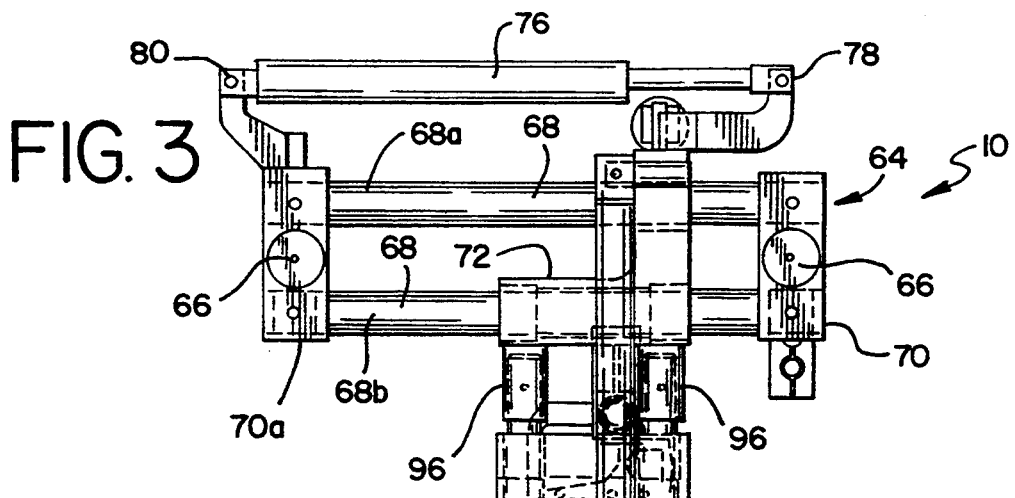
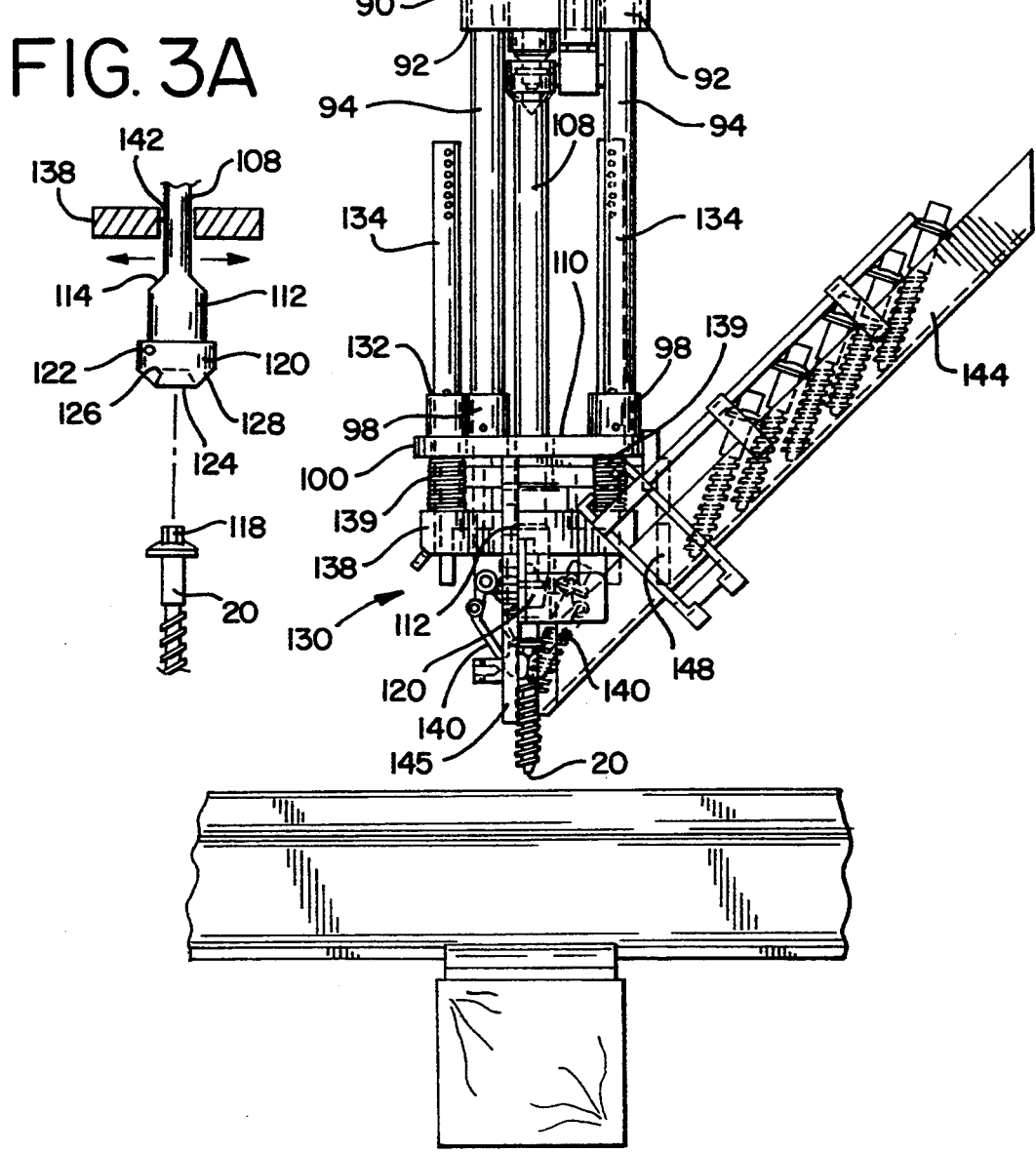

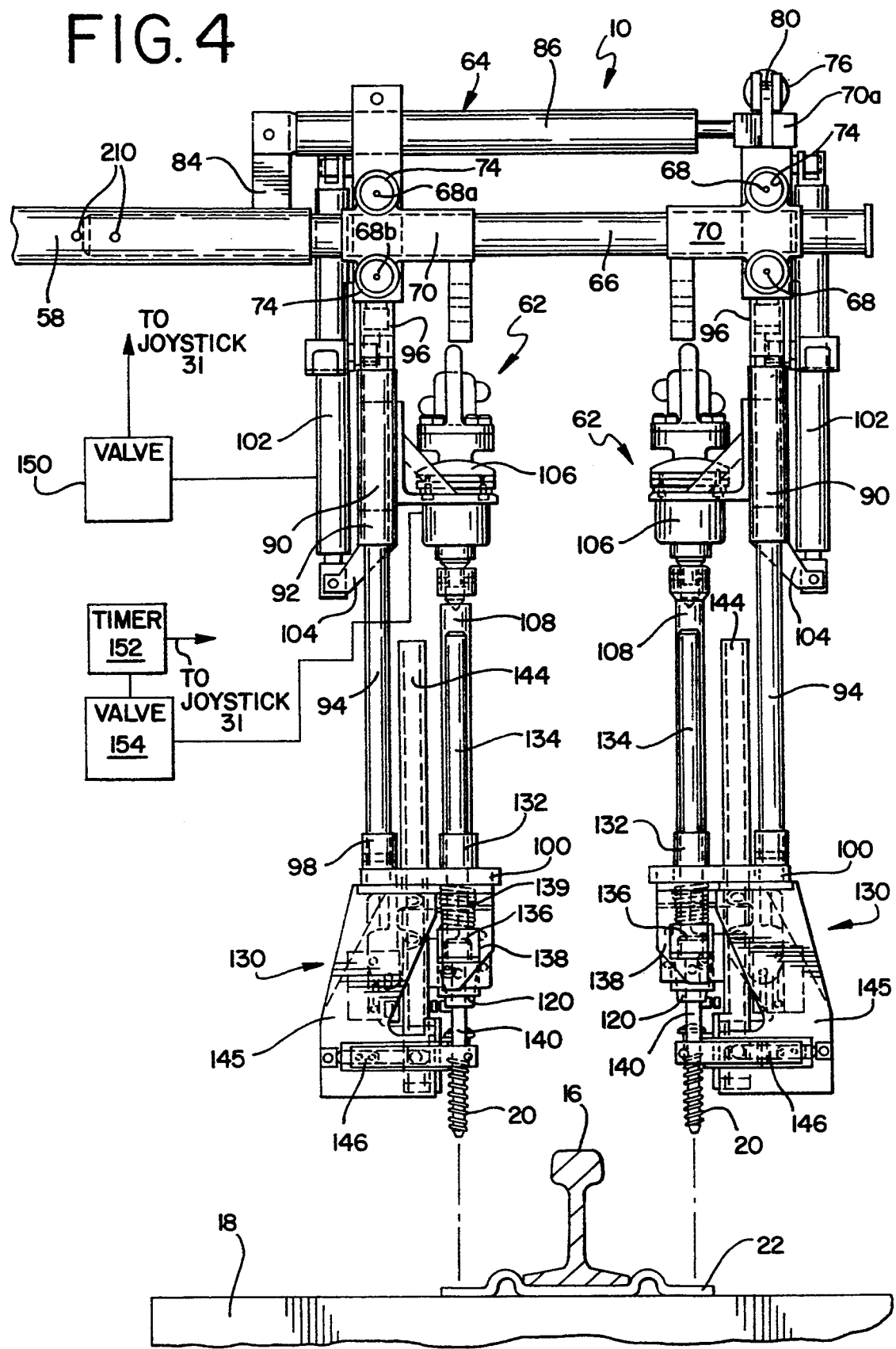

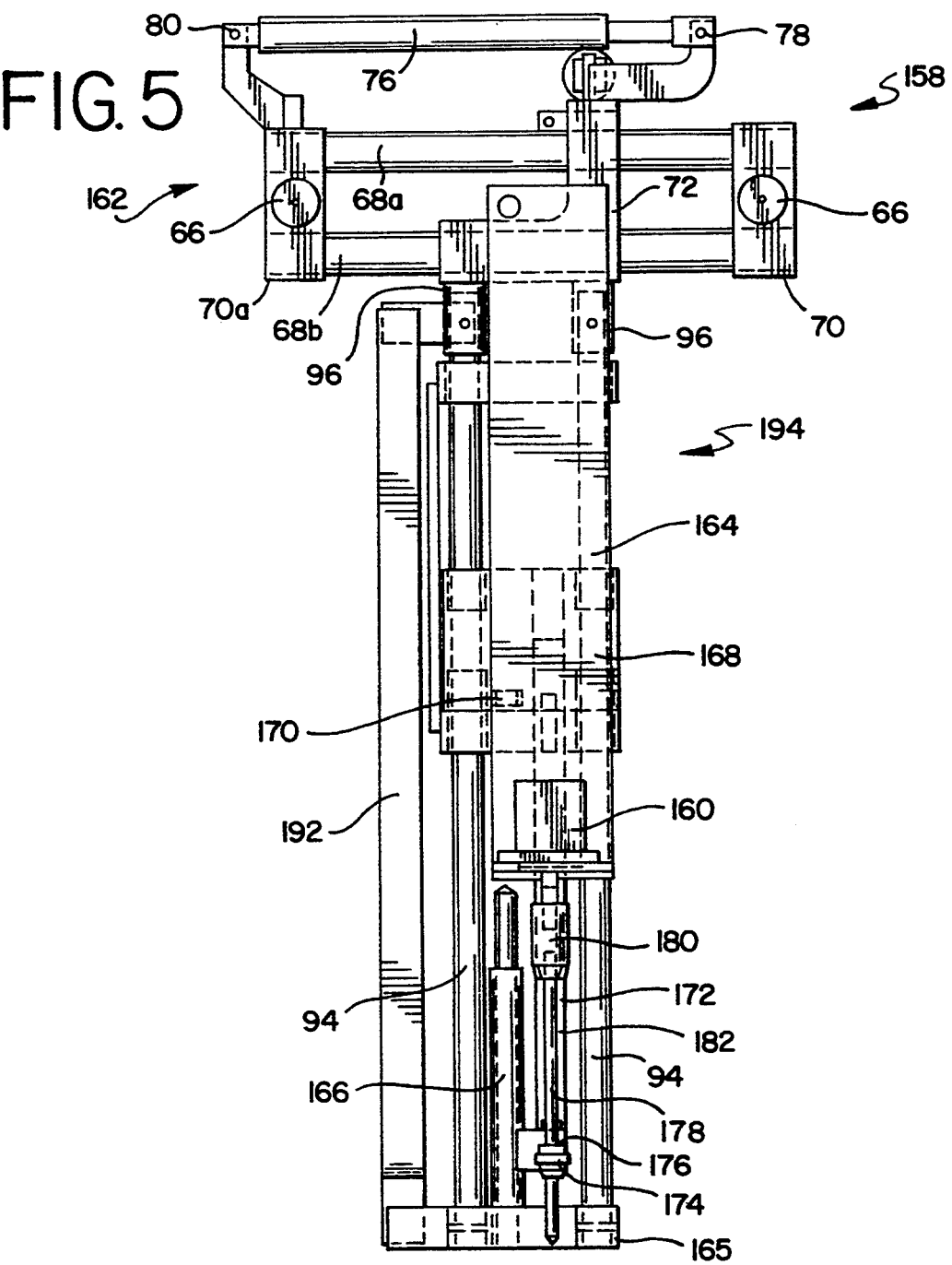
FIG. 5
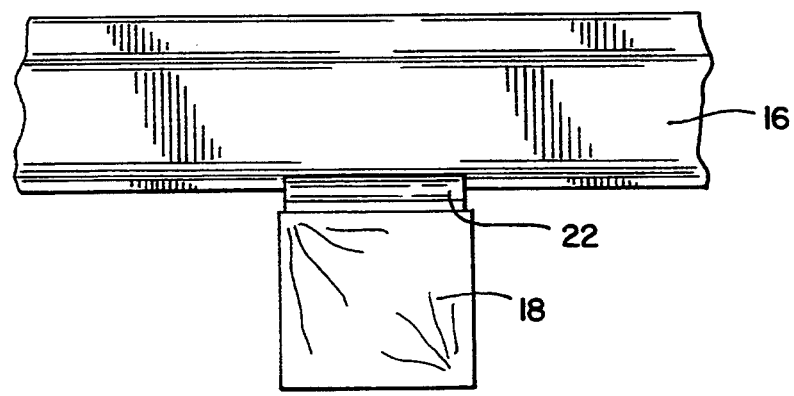

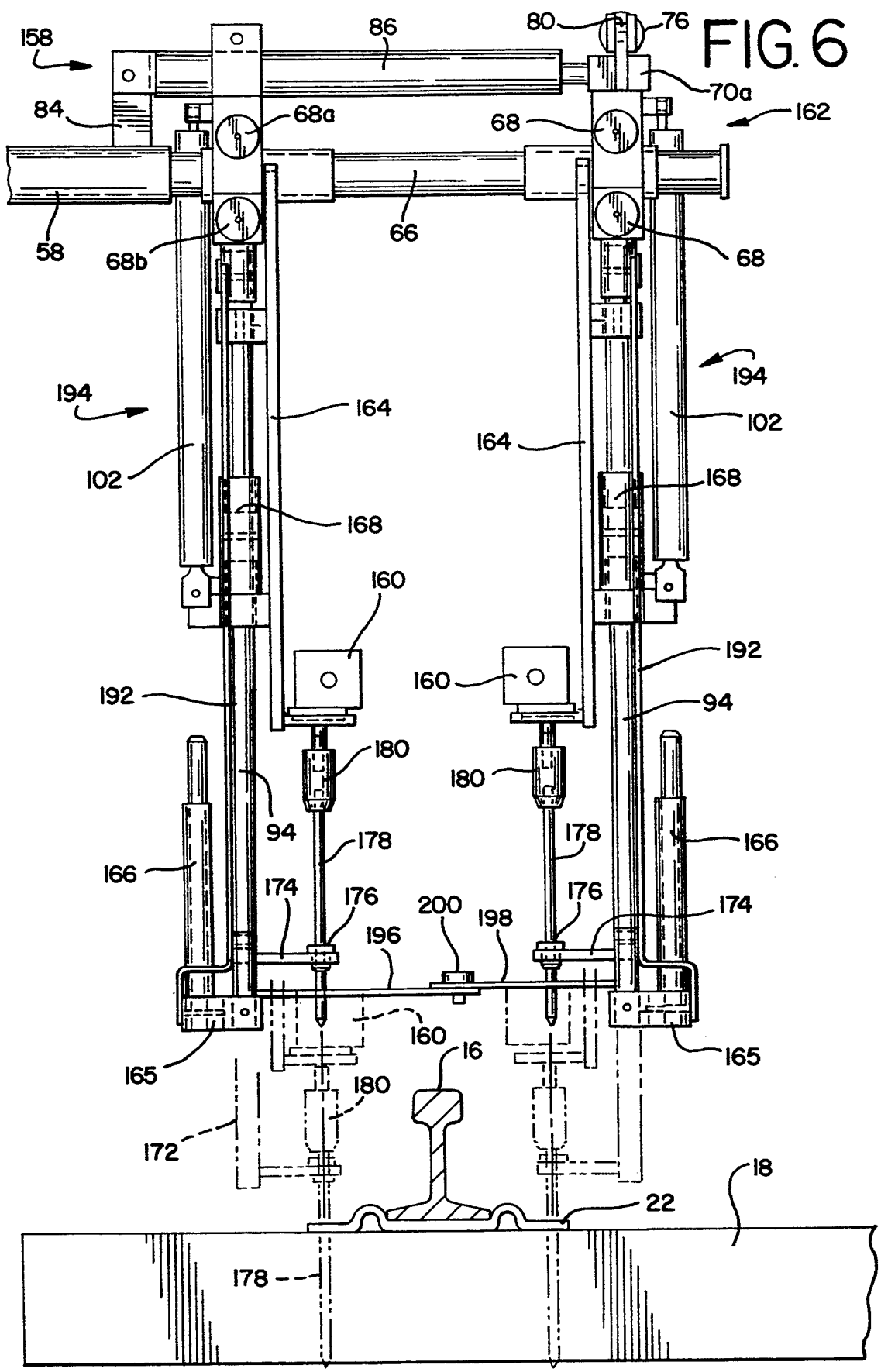

AUTOMATIC RAIL FASTENER APPLICATOR

RELATED APPLICATION

The present application is related to copending U.S. patent application Ser. No. 08/171,112 filed Dec. 21, 1993 for "MODULAR RAILWAY MAINTENANCE SYSTEM."

BACKGROUND OF THE INVENTION

The present invention is related to machines used in performing railway right-of-way maintenance, and specifically to a machine for driving railroad rail fasteners such as lag screws or nuts into or onto railroad track ties using an axially rotatable motion.

Conventional railroad rails are secured to the ties by so-called cut spikes which are driven by vertically directed forces through tie plate apertures into the wooden railroad ties. However, it has been found that certain portions of track, such as those bearing high tonnage traffic, as well as curved track sections, wear out faster than others, and require more frequent replacement. A side effect of frequent rail replacement is that the spikes have a tendency to loosen in the ties, especially in high tonnage sections of track.

As a result of these conditions, maintenance directors of railroads have determined that alternate fastening technologies to cut spikes should be explored. One alternative is to use so-called hairpin spikes, which have depending prongs designed to spread apart within the tie. Although hairpin spikes are used in some high traffic portions of track, they are somewhat limited in their application, in that such spikes are more difficult to drive into and pull from the ties using automatic equipment.

Another type of fastener which is being considered is the rail lag screw, which is similar in dimension to a cut spike, with the major difference being that the lag screw is designed to be axially rotated in the tie. As such the lag screw has a threaded shank and a polygonal head for engagement by driving tools.

Yet another type of alternate rail fastening system employs relatively permanent concrete ties having threaded studs embedded therein for securing the rails. Upon placement of a rail on the concrete ties, nuts are threaded onto the studs to secure the rail. One other type of fastener is a releasable clip, which is also preferably used with concrete ties.

A conventional technique for driving rail lag screws employs a hand-held rotary impact wrench which engages the head of the spike and can either drive or remove the lag screw at the direction of the operator. However, a major drawback of this technique is that during placement, either two operators are required, e.g. one to place the screws and one to operate the impact wrench, or a single operator must perform both tasks at an appreciably slower pace. Either way, this technique is inefficient and labor intensive.

Designers of conventional automatic spike driving machines have traditionally focused on the problems of rapidly, accurately and quietly driving cut spikes into the ties with vertically directed pushing and/or percussive forces without bending individual spikes. One example of a cut spike driving machine employing such vertical forces is commonly-assigned U.S. Pat. No. 5,191,840, which is incorporated by reference herein. However, in view of the relatively recent attention directed to alternate rail fastening technologies, designers of such equipment have not yet addressed the unique problems inherent with automatically handling, driving and removing lag screws or nuts.

Thus, there is a need for a machine which can automatically handle lag screws, and which permits an operator to drive them accurately, preferably into pre-drilled holes in the ties. There is also a need for a machine which will automatically remove the lag screws or other fasteners from the ties to permit the rapid replacement of rails on curves and high tonnage traffic areas.

Consequently, a first object of the present invention is to provide a device which can automatically drive alternate rail fasteners, such as lag screws and/or nuts.

Another object of the present invention is to provide a rail fastener driving device which can drive lag screws and/or nuts with minimum operator effort.

Still another object of the present invention is to provide a rail fastener driving device which features the capability of accurately aligning the fastener relative to the tie.

Yet another object of the present invention is to provide a rail lag screw driving device which positively engages the heads of the lag screws without causing deformation and/or misalignment of the screws.

A further object of the present invention is to provide a rail maintenance machine which is convertible from fastener applicating using an automatic device, to tie boring, using a device separately mounted to the machine.

SUMMARY OF THE INVENTION

Accordingly, the above-identified objects are met or exceeded by the present automatic rail fastener applicator device. The applicator device is mounted on a self-propelled, operator directed frame, and includes an automatic drive portion, including a vertically reciprocating impact wrench or equivalent drive tool, a carriage portion for locating the impact wrench over the holes in the ties, and a fastener feed apparatus whereby the operator inserts fasteners such as lag screws for transfer to the drive portion.

More specifically, the present automatic fastener applicator is designed for securing fasteners to track support members of a railroad track and includes a retaining apparatus for receiving and orienting at least one of the fasteners for application to the track support members, and a drive apparatus for automatically engaging at least one of the oriented fasteners and for rotating the fastener axially for engagement upon a selected one of the at least one rail support members.

In another embodiment, a railway maintenance machine having an automatic rail fastener applicator for mounting to the machine for applying fasteners to railroad track support members, includes a retaining apparatus connected to the machine for receiving and orienting at least one of the fasteners for application to the track support member, and a drive apparatus connected to the machine for sequentially engaging one of the rail fasteners and for axially rotating the fastener to secure the fastener to the support member. An advantage of the applicator is that it is releasably mounted to the machine, and can be interchanged with another module, such as a tie boring module. Thus, when each side of the machine corresponds to one of the rails of a railroad track, either the applicator or the tie borer module may be mounted to each side of the machine.

BRIEF DESCRIPTION OF THE DRAWINGS

FIG. 3 is an elevational view of the present rail fastener applicator device as seen from a side of the machine of FIG. 1;

FIG. 3A is an enlarged partial elevational view of the extension and socket of the present applicator;

FIG. 4 is an elevational view of the rail fastener applicator device of FIG. 3 as seen from the rear of the machine of FIG. 1, with portions deleted for clarity;

FIG. 5 is an elevational view of a tie borer module suitable for use with the present machine as seen from a side of the machine of FIG. 1; and FIG. 6 is an elevational view of the tie borer module of FIG. 5 as seen from the rear of the machine of FIG. 1.

DESCRIPTION OF THE PREFERRED EMBODIMENT

Figure 1:
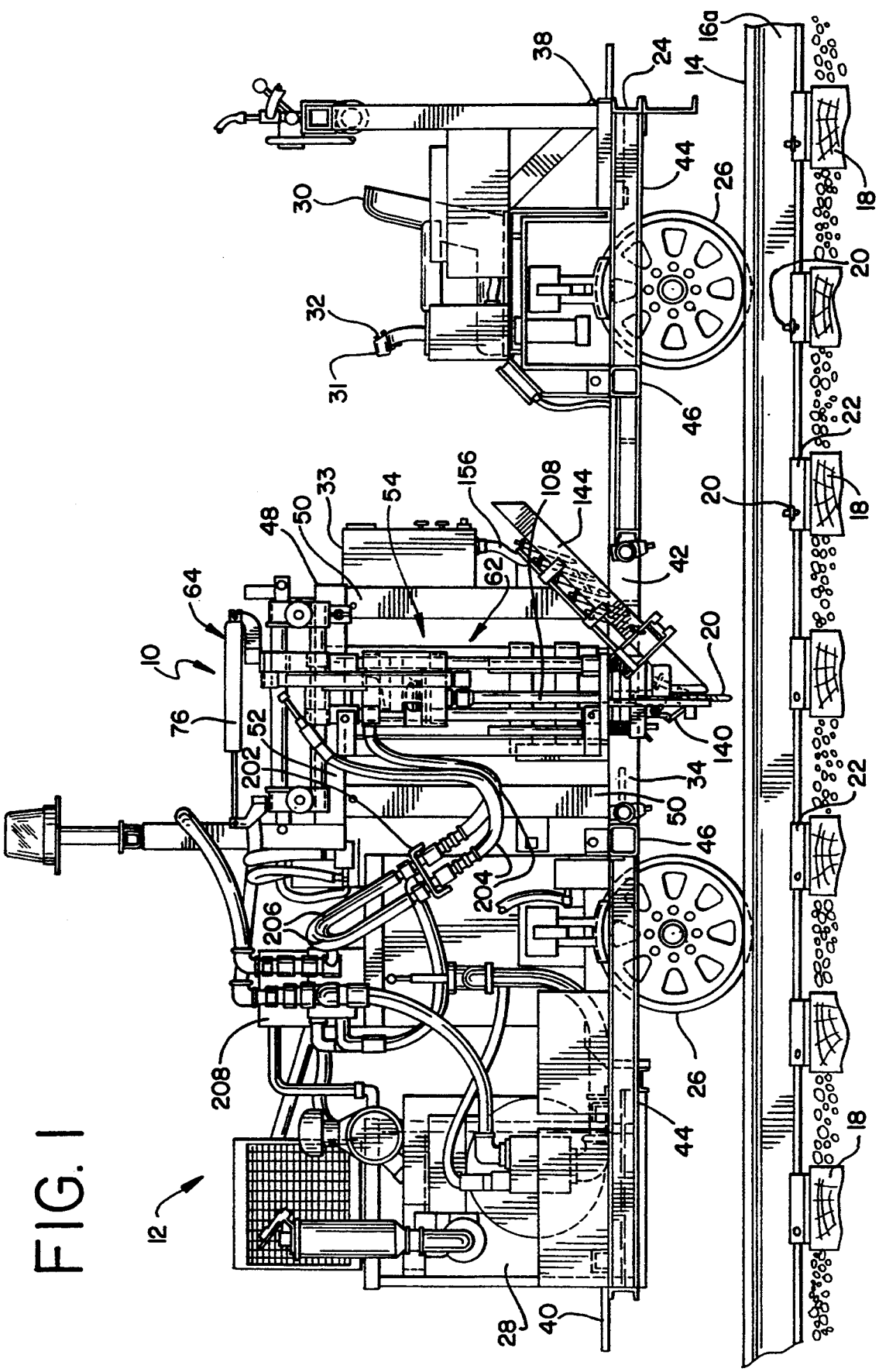
FIG. 1 is a side elevational view of a rail maintenance machine of the type suitable for embodying the present fastener applicator.
Figure 2:
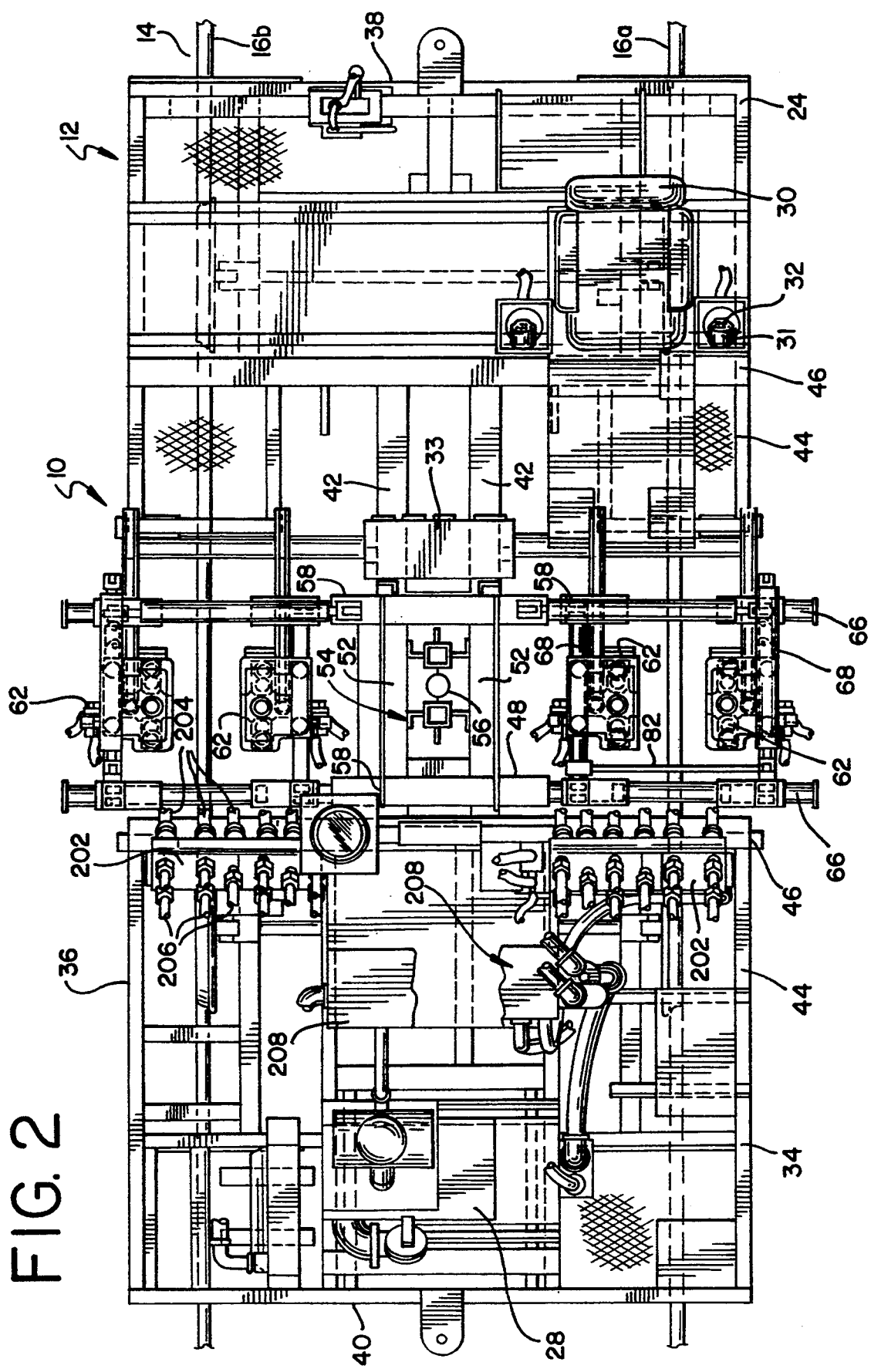
FIG. 2 is a top plan view of the machine of FIG. 1.

Referring now to FIGS. 1 and 2, the present fastener applicator device, also referred to as a lag screw applicator module, is generally designated 10 and is designed for mounting upon a railway maintenance machine or base unit, generally designated 12. The machine 12 is preferably designed to be self-propelled on a railroad track 14, however remote propulsion sources are contemplated. The track 14 includes first and second rails 16a, and 16b, respectively, and a plurality of rail support members commonly referred to as ties 18 to which the rails are connected by fasteners 20, which pass through tie plates 22. In the preferred embodiment, the fasteners 20 are lag screws, however it is also contemplated that the present device 10 may be used with nuts to be threaded upon vertically projecting studs (not shown) as are known in the art.

The base unit 12 includes a frame 24 supported on a plurality of wheels 26 such that the frame can be driven along the rails 16a, 16b. The frame 24 supports a source of motive power 28 such as an internal combustion engine, which propels the unit 12 and also powers the fluid power system, which in the preferred embodiment is hydraulic. Also supported on the frame 24 is at least one operator's seat 30. At least one of the operator's seats 30 is provided with at least one control joystick 31 having at least one trigger or other functional controls such as actuator buttons 32. The operator's seat and the joystick 31 are located in operational proximity to a central control panel 33.

Referring now to FIGS. 1 and 2, it will be evident that the frame 24 has a first side 34 and a second side 36, each side corresponding to one of the rails 16a, 16b. In addition, the frame 24 has a first end 38 and a second end 40. The seat 30 is movable between the first side 34 and the second side 36 to enable the operator to perform maintenance operations on either rail 16a, 16b.

Also included on the frame 24 are a pair of generally parallel main tubes 42. The main tubes 42 are positioned to be approximately parallel to the rails 16a, 16b and are fixed at each end to generally rectangular portions 44, each of the latter including a transversely positioned cross tube 46.

A centrally located, elevated portion 48 of the frame 24 is supported by generally vertical columns 50 which are joined at their respective upper ends by horizontal beams 52 to define a generally box-shaped operational zone 54. The operational zone 54 is the area within which the present fastener applicator module 10 is connected. At a lower end of the frame 24 below the operational zone 54 is mounted a fluid powered tie nipper assembly 56 (best seen in FIG. 2) which grasps the tie 18 into which the lag screw 20 is being driven.

At the top of the elevated portion 48 are located a pair of carriage support tubes 58 which are located in spaced parallel relationship to each other and are transverse to the rails 16a, 16b. The tubes 58 serve as upper connection points for the applicator module 10.

Referring now to FIGS. 3, 3A and 4, the fastener applicator module 10 is shown in greater detail. Basically the module 10 includes at least one, and preferably two fastener applicator units 62 which are commonly referred to as fastener applicator guns. For purposes of clarity, only one such gun 62 is depicted in FIGS. 1 and 3. Each gun 62 is suspended from the elevated portion 48 of the frame 24 in a known manner by a so-called "spotting" carriage 64 which enables the gun to be adjustably positioned with respect to the frame 24, as well as the track 14, both linearly and transversely, for proper alignment of a gripped lag screw 20 into a selected hole in the tie plate 22. Normally, tie plates 22 have several such holes into which spikes or lag screws 20 are inserted for securing the rails 16 to the ties 18.

Included on the spotting carriage 64 are a pair of spaced, parallel main carriage shafts 66, which are oriented transversely to the rails 16a, 16b and parallel to the ties 18. Also included on the spotting carriage are at least a pair of spaced, parallel carriage cross shafts 68, which are secured at right angles to the main carriage shafts 66 to form a parallelogram. In the preferred embodiment, upper and lower cross shafts 68a, 68b are provided to enhance stability of the guns 62. The respective shafts 66, 68 are secured to each other by carriage blocks 70. Movement of each gun 62 parallel to the rails 16 on the spotting carriage 64 is enabled by a slide block 72 located at the upper end of the gun 62. Each slide block 72 includes a transverse throughbore 74 which slidably engages a respective one of the cross shafts 68. A double acting fluid power cylinder 76, preferably a hydraulic cylinder, is connected to the top of the slide block 72 at 78, and to the carriage block 70a at 80 for controlling the position of the gun 62 relative to the carriage shafts 66. Although only one of the guns 62 is connected to the cylinder 76, the other gun is also slidably engaged on the corresponding carriage cross shaft 68 by slide block 72, and the two slide blocks 72 are designed to move in unison relative to each other by virtue of an adjustable tie bar assembly 82 (best seen in FIG. 2) which also adjustably determines the relative positions of the two guns 62 of each device 10 on the shafts 68 relative to the longitudinal axis of the rails 16.

Movement of the guns 62 in the direction transverse to the rails 16 is determined by the sliding action of the slide blocks 70, 70a and the carriage cross shafts 68 on the main carriage shafts 66 relative to an inner frame mounting shaft 84. The shaft 84 is fixed to a corresponding one of the carriage support shafts 58. A second double acting fluid power cylinder 86 is connected to an upper end of the slide block 70a and to the frame mounting shaft 84 to control the sliding action of the slide block 70a, the carriage cross shafts 68 and the guns 62 transversely relative to the rails 16. A second adjustable tie bar assembly (not shown) adjustably determines the relative positioning of the guns 62 to each other in the direction transverse to the rails 16.

An impact wrench mounting bracket 90 has a pair of vertically extending sleeves 92, each dimensioned to slidingly engage a corresponding vertical carriage shaft 94. The carriage shafts 94 are disposed in spaced, parallel relationship to each other and depend at upper ends from sockets 96 integral with the slide block 72. Lower ends of the shafts 94 are inserted into sockets 98 in a feeder frame 100. A fluid power cylinder, preferably a double-acting hydraulic cylinder 102 (best seen in FIG. 4) is used to reciprocally move the impact wrench mounting bracket 90 vertically relative to the vertical carriage shafts 94. The cylinder 102 is connected between the slide block 72 and a tab 104 located on the impact wrench mounting bracket 90.

An impact wrench 106 having an elongate, depending extension 108 is mounted to the bracket 90 and provides the driving force for the application of fasteners 10. In the preferred embodiment, the wrench 106 is a reversible, hydraulically-powered wrench of the type manufactured by the Stanley Works, New Britain, Conn., under Model No. IW-16, however other suitably equivalent impact wrenches, as well as hydraulic motors or electric motors are contemplated.

The extension 108 passes through an opening 110 which is centrally located in the feeder frame 100. The extension 108 also includes a lower end 112 provided with a radially enlarged portion including a shoulder 114. In the preferred embodiment, the shoulder 114 is tapered to facilitate locating the enlarged lower end 112 relative to an attachment to the feeder frame as will be described below.

Referring to FIG. 3A, an important function of the gun 62 is to ensure that the extension 108 is properly aligned and positioned for engagement with a head portion 118 of one of the lag screws 20. To that end, included on the lower end 112 of the extension 108 is a drive socket 120 which is securely attached to the extension for ensuring common axial rotation of the two components. This attachment is achieved by a locking pin 122 passing through the socket 120 and the extension 108, and may alternately be a cotter pin or other type of keyed arrangement. The socket 120 has at its lower end a polygonal-shaped counterbore 124 which in the preferred embodiment is an eight-point pattern, however other configurations are contemplated. A peripheral edge 126 of the counterbore 124 is chamfered to facilitate the locating of the socket 120 upon the head portion 118 of the lag screw 20. In addition, a lower end 128 of the socket 120 is tapered into a depending frusto-conical shape. It is also contemplated, that in applications where nuts are to be driven onto studs embedded in the tie, that the socket 120 will be configured as a deep well socket to accommodate the length of the stud.

Referring again to FIGS. 3, 3A and 4, a gripping portion of the lag screw applicator device 10 is generally designated 130, and has at its upper end the feeder frame 100, which defines the central opening 110 for the passage of the extension 108. In function, the gripping portion 130 receives lag screws 20 and orients them for proper application into or onto the ties 18. In the preferred embodiment, the opening 110 is circular in shape, however other shapes are contemplated. Also included in the feeder frame 100 are a plurality of relatively smaller throughbores 132 disposed for the reciprocal vertical slidable passage of a like plurality of guide rods 134, which guide the reciprocating vertical movement of the gripping portion 130. Preferably two through-bores 132 are provided for the accommodation of two guide rods 134 for each gun 62. The guide rods 134 project vertically a substantial distance from the feeder frame 100 to provide sufficient travel of the gripping portions 130 toward the ties 18.

A lower end of each of the guide rods 134 matingly engages a corresponding socket 136 in a jaw mounting 138. To provide a downward biasing force on the jaw mounting 138, in the preferred embodiment each guide rod 134 is provided with a coiled spring 139 retained by the rod 134 in sandwiched relationship at an upper end to the bottom of the feeder frame 100, and at a lower end to the upper end of the jaw mounting.

A pair of gripping jaws 140 are mounted to the mounting 138 in opposed relationship to grasp a lag screw 20 therebetween. The jaws 140 are biased toward the closed or gripping position by at least one spring (not shown). The jaw mounting 138 also defines a central opening 142 (best seen in FIG. 3A) through which the extension 108 passes to separate the jaws 140 and push the lag screw 20 into the tie 18. Central opening 142 is preferably coaxial with the opening 110 in the feeder frame 100. In dimension, the drive socket 120 has a larger diameter than the central opening 142. Thus, retraction of the extension 108 will also retract the jaw mounting 138 and the guide rods 134.

An important feature of the present lag screw applicator device 10 is that the extension 108 is permitted a specified amount of radial deflection relative to the feeder frame 100 as well as to the impact wrench mounting bracket 90. This relatively loose orientation of the extension 108 is in stark contrast to conventional spike driving machines, in which great pains are taken to maintain a rigid relationship between the spike applicator gun and the frame of the machine. Rigidity is critical when driving cut spikes to avoid bending the spikes or driving them on an angle. Furthermore, conventional spike driving machines of the type disclosed in commonly-assigned U.S. Pat. No. 5,191,840 employ elongate anvil extensions which are vertically reciprocating relative to the carriage. These elongate shafts are securely supported against radial movement of the very type which is desired in the present module 10. When driving lag screws, once the socket 120 is engaged upon the head 118 of the lag screw 20, radial play of the extension 108 assists in the placement of the fastener into the hole in the tie 18. In most cases, these holes are predrilled prior to the application of the fasteners 20.

A lag screw tray or magazine 144 is inclined from an area within reach of the operator's seat toward a point below the feeder frame 100 to feed aligned lag screws 20 to the jaws 140 by gravity in a manner well known to skilled practitioners. A feeder tongue 145 mounted to depend from the feeder frame 100 has a hydraulically operated, reciprocating feeder cylinder 146 (best seen in FIG. 4) to control the delivery of lag screws 20 from the tray 144 to the jaws 140. If desired, an additional hydraulically operated tongue 148 (best seen in FIG. 3) may be provided to control the flow of lag screws 20 in the tray 144. Similarly, the tray 144 may also retain a supply of hex nuts or other suitable rail fasteners.

Referring now to FIG. 4, the control mechanism for operating the impact wrench 106 includes a first solenoid operated hydraulic valve 150 for controlling the flow of hydraulic fluid to the cylinder 102. The valve 150 is schematically shown, and is contemplated as being a four-way, three-position valve or equivalent.

The valve 150 is operated by the operator through the joystick 31. An electric timer 152 is connected to the joystick 31 and to a second solenoid operated hydraulic valve 154 which controls the flow of hydraulic fluid to the impact wrench 106, causing the rotation of the extension 108. Thus, upon activation of the valve 150, there is generated a simultaneous electronic signal to the timer 152, which delays the actuation of the valve 154 for a specified period of time. Although only one gun control system is depicted in FIG. 4, it will be understood that each gun 62 has a similar control system. The remainder of the hydraulic circuitry for operating the spotting carriage 64 and the machine 12 is well known to skilled practitioners, and an example of such is depicted in commonly assigned U.S. Patent No. 5,191,840. The electronic controls of the hydraulic function of the lag screw applicator module 10 are contained in the control panel 33 to which the module is connected by a detachable cable 156 (best seen in FIG. 1).

Referring now to FIGS. 5 and 6, another feature of the present rail fastener 10 is that it is configured so that the pair of lag screw applicator guns 62 and the corresponding spotting carriage 64, collectively referred to as the lag screw applicator module 10, may be easily removed and replaced with a tie borer attachment or module generally designated 158. The module 158 is designed for boring holes for accommodating lag screws or other fasteners and includes at least one and preferably a pair of tie drills 160 equipped with their own shared tie borer spotting carriage 162.

In the preferred embodiment, a tie borer spotting carriage 162 is identical to the spotting carriage 64, and other components of the module 158 which directly correspond to components of the applicator module 10 have been designated with identical reference numerals. The most significant difference between the tie borer module 158 and the lag screw applicator module 10 is that the tie borer has replaced the impact wrench 106 with the hydraulically operated drill 160. Similarly, the vertically slidable impact wrench mounting bracket 90 has been replaced by a drill mounting bracket 164.

Basically, the hydraulic cylinder 102 moves the mounting bracket 164 vertically along the carriage shafts 94. A lower bracket 165 replaces the feeder frame 100 and the gripping portion 130, and provides a lower attachment for the vertical carriage shafts 94. An adjustable vertically projecting spacer rod 166 controls the vertical travel of a slide block 168 by providing a stop for a tab 170 (shown hidden in FIG. 5) projecting laterally from a lower end of the slide block 168. An "L"-shaped bit guide 172 has a laterally extending leg 174 provided with a throughbore 176. The throughbore 176 slidingly accommodates a rotating bit 178 of the hydraulic drill 160. Connection of the bit 178 to the drill 160 is made by a chuck 180. The leg 174 of the bit guide 172 is connected to a vertical shaft 182 mounted at its upper end to a lower end of the slide block 168. The bracket 164 moves on the shafts 94 independently of the slide block 168 and the bit guide 172.

Another structural difference between the tie borer module 158 and the fastener applicator module 10 is that, unlike the guns 62, the individual tie drills 160 must be kept rigidly supported relative to the spotting carriage 162. To achieve this support, each of the two drill assemblies, each generally designated 194, is connected to its mate by at least one pair of bars 196, 198 (best seen in FIG. 6), which are fixed to lower ends of the vertical carriage shafts 94, and to each other by a locking pin 200. In certain applications, a suitable threaded tie bar (not shown) similar to the tie bar assembly 82 may also be included to maintain the relative position of the two drill assemblies 194 to each other.

The control of the tie borer module 158 is similar to the lag screw applicator module 10, with the same valves 150 and 154, which in this case are actuated simultaneously, respectively controlling the descent and ascent of the bracket 164 on the vertical carriage shafts 94, and the rotation of the bit 178 fixed in the chuck 180 of the drill 160. Hydraulic connections for both the modules 10 and 158, are made at a manifold quick connect plate 202 (best seen in FIGS. 1 and 2), at which hydraulic module lines 204 connected to the various cylinders 76, 86, 102 and the hydraulic accessories 106, 160 of the modules 10, 158, respectively, are releasably connected to valve lines 206 connected to a bank of corresponding valves 208 mounted on the frame 24 (best seen in FIG. 1). Each connection point on the plate 202 is identified, such as by size of fitting, to prevent misconnection of module lines valve lines. Electrical connection of the module 158 to the machine 12 is achieved at the control panel 33 through a cable 156. The control panel has suitable switching circuits to differentiate the functions of the modules 10 and 158.

The lag screw applicator module 10 is removed from the frame 24 by withdrawing the carriage shafts 66 from the carriage support tubes 58, by disconnecting the cable 156, and disconnecting the modules lines 204 from the plate 202. Once the lag screw applicator module 10 is removed from the frame 24, the tie borer module 158 may be secured to the elevated portion 48 of the frame 24. The main carriage shafts 66 of the module 158 are inserted into the carriage support tubes 58 and held there by locking pins 210 (best seen in FIG. 4) passing through corresponding throughbores in the tubes 58 and corresponding shafts 66. The locking pins 210 are also used to lock the module 10 upon the frame 24. Next, the electrical cable 156 of the module 158 is connected to the control panel 33, and the respective module lines 204 are connected to the plate 202.

It will be appreciated that a major advantage of the present invention is that the tie borer module 158 may be mounted to one side 34, 36 of the frame 24, while the lag applicator module 10 may be mounted to the other side of the frame. In this manner, the machine 12 becomes much more versatile, and allows different operations to be performed on either rail 16 from the basic machine 12.

In operation, and with the lag screw module 10 connected to at least one side 34, 36 of the frame 24, the operator clamps the frame 24 to the ties 18 using the gripping assembly 56, and loads the tray 144 with fasteners 20. Next, the operator actuates the control joystick 31 to control the spotting carriage hydraulic cylinders 76, 86 to manipulate the fastener applicator gun 62 relative to the rail 16.

Both the applicator module 10 and the tie bore module 158 operate so that the gun 62 or analogous structure moves between an "up" position, a slightly lower "ready" position, and a lowermost "drive" or "drill" position. Movement between these three positions is controlled by limit switches (not shown) located on a support member 192. While in the "ready" position (best seen in FIG. 3), the gun 62 receives the lag screw 20 from the tray 144 and is manipulated to be directly over a designated hole in a tie plate 22 through which it is desired to drive a lag screw 20 into the corresponding tie 18. The operation of the limit switches is described in greater detail in U.S. Pat. No. 5,191,840.

An actuator button or switch 32 on the control joystick 31 is then actuated to initiate the lag screw application process. First of all, a lag screw 20 is permitted by the feeder tongues 146 and 148 to drop from the tray 144 into the central opening 142 defined by the jaws 140. Next, through the operator's pushing of the same button 32 on the joystick 31, the hydraulic cylinder 102 receives hydraulic fluid to gradually extend the extension 108 to a lowered position. A significant feature of the present invention is that the extension 108 is lowered without the application of excessive vertical force, as is the case with conventional pusher-type hydraulic spike driving machines.

As the extension 108 descends, the drive socket 120 engages the lag screw 20 held by the jaws 140, and gradually lowers the lag screw toward the hole in the tie plate 22. The electric timer 152 causes a delay in the application of hydraulic fluid to the impact wrench 106. In this manner, the rotation of the drive socket 120 is delayed until, with the assistance of the slight downward force of the extension 108, the socket 120 is properly seated on the head 118 of the lag screw, such seating action being facilitated by the chamfered periphery 126 of the drive socket 120.

At the conclusion of the specified delay period caused by the timer 152, preferably in the range of 0.5 to 1.0 second, the valve 154 is actuated to permit the flow of hydraulic fluid to the impact wrench 106. The impact wrench 106 then begins to axially rotate the extension 108, which also rotates the lag screw 20 in the hole of the tie plate 22, and continues to do so until the operator lifts his finger off of the same button 32 on the joystick 31, or until an internal clutch of the impact wrench 106 senses a predetermined torque, as is well known to skilled practitioners, and which may also be a standard feature of the wrench.

As the extension 108 rotates, the jaws 140 are opened due to the downward vertical force of the cylinder 102 exceeding the force of the jaw springs. Once the lag screw 20 has been tightly fastened into the tie, the operator presses another button on the joystick, and the valve 150 is actuated so that the extension 108 is retracted, and with it the jaw mounting 138. The engagement of the socket 120 against the jaw mounting 138 causes the upward movement of the gripping portion 130. If the operator desires to remove already existing lag screws or other fasteners from the tie, the individual impact wrenches 106 are adjusted to reverse direction, as is known in the art. The manipulation and activation of the gun 62 is similar to the driving operation, merely reversed.

When the tie borer module 158 is connected to the frame 24, a pair of drill assemblies 194, analogous in structure to the applicator guns 62, are located over the tie 18 to be bored by the operator, using the spotting carriage 162, under the control of the joystick 31. Once the drill assembly 194 has been properly positioned, the operator presses the same actuator button or switch on the joystick 31 as in the case of the lag screw module 10, to pressurize the cylinder 102 and lower the assembly 194 toward the tie 18.

The bracket 164, the drill 160 with its spinning bit 178 and the slide block 168 descend on the shafts 94 until the tab 170 on the block 168 abuts the spacer rod 166. This ends the descent of the bit guide 172 (as shown in phantom in FIG. 6). Next, the drill 160 descends further, and the spinning bit 178 bores into the tie 18 (shown in phantom in FIG. 6) until a downward limit switch (not shown) is automatically actuated.

Upon completion of the tie boring process, the drill 160 is vertically retracted by actuating the valve 150 through the joystick 31, and the operator then proceeds to the next hole location. It will be appreciated, that regardless of which module 10 or 158 is attached to the frame 24, that the operator will be operating only one side 34, 36 of the machine at a time, and will similarly operate only one of the applicator guns 62 or tie borer assemblies 176 on each side at a time. It will also be noted that for purposes of greater flexibility, the machine may be equipped with a fastener application 10 on one of the sides 34, 36, and a tie borer module 158 on the other side.

Thus, a major feature of the present automatic rail fastener applicator is a system for rapidly and accurately positioning and applying rail fasteners such as lag screws without bending or misaligning them. Another feature is the capability of automatically removing previously installed lag screws for rapid rail removal or replacement. Still another feature of the present invention is the ability to readily convert the basic machine from performing lag screw applying to tie boring.

While a particular embodiment of the automatic rail fastener applicator of the invention has been shown and described, it will be appreciated by those skilled in the art that changes and modifications may be made thereto without departing from the invention in its broader aspects and as set forth in the following claims.

What is claimed is:

1. An automatic fastener applicator for securing fasteners to rail support members of a railroad track, said support members having predrilled holes for accommodating the fasteners, said applicator being configured for attachment to a rail maintenance machine which moves along the railroad track performing at least one maintenance operation, said applicator comprising:

retaining means for receiving and orienting at least one of the fasteners for application to the track support members;

drive means for automatically engaging at least one of the oriented fasteners, for lowering the engaged fastener to close proximity with a selected rail support member, for locating the fastener into one of the predrilled holes and for rotating the engaged fastener axially for engagement upon the rail support member;

said retaining means including at least one gripping member configured to retain the fastener upon engagement by the drive means and as the fastener is axially rotated, and to movably disengage from, and release the fastener as said drive means drives the fastener into the rail support member;

said drive means including an extension member depending from a drive unit and disposed relative to said retaining means for engaging the at least one fastener, and said retaining means including a support member defining a throughbore for slidably accommodating said extension member; and said extension member having a configuration being dimensioned to engage said retaining means so that upward vertical movement of said extension member will cause said retaining means to also move vertically away from the rail support member.

2. The applicator as defined in claim 1 further including fastener storage and feed means for retaining a plurality of the fasteners and for feeding the fasteners to said retaining means.

3. The applicator as defined in claim 1 further including carriage means connected to said retaining means and said drive means for moving said applicator relative to the track support members.

4. The applicator as defined in claim 1 wherein said extension member is permitted a specified amount of radial deflection by said throughbore for locating the fastener relative to the rail support member.

5. The applicator as defined in claim 4 wherein said drive means includes a socket secured to an end of said extension member, said socket having a polygonal counterbore with a chamfered socket margin for positively engaging one of the at least one fastener.

6. The applicator as defined in claim 5 wherein said drive means further includes means for reversably rotating said socket and said extension member.

7. The applicator as defined in claim 4 wherein said retaining means includes a bracket defining a throughbore, and said extension member is provided with alignment means for aligning said extension member relative to said retaining means, said alignment means includes a radially projecting shoulder located at an end of said extension member for engaging said throughbore on said bracket.

8. The applicator as defined in claim 4 wherein said extension member has a socket secured at a lower end thereof, said socket being dimensioned to engage said support member.

9. The applicator as defined in claim 1 further including control means for controlling the vertical position of the drive means, as well as the axial rotation of said drive means.

10. The applicator as defined in claim 9 wherein said control means is configured to delay rotation of said drive means to permit said drive means to positively engage the at least one fastener.

11. The applicator as defined in claim 1 including at least two separate applicator units each having dedicated retaining means and driving means for sequentially applying the fasteners to the track support members on either side of a rail of the railroad track.

12. A railway maintenance machine for movement along a railroad track for performing at least one maintenance task thereon, the machine having an automatic rail fastener applicator for mounting to the machine for applying fasteners to railroad track support members, said support members having predrilled holes for accommodating the fasteners, said machine comprising:
retaining means connected to said machine for receiving and orienting at least one of the fasteners for application to a selected track support member;
drive means for sequentially engaging one of the oriented rail fasteners, for lowering the engaged fastener to close proximity with the rail support member, for locating the fastener into one of the predrilled holes and for axially rotating the fastener to secure the fastener to the rail support member;
said retaining means includes at least one gripping member configured to retain the fastener as it is engaged by the drive means and as the fastener is axially rotated, and to movably disengage from, and release the fastener as said drive means drives the fastener into the rail support member;
said drive means including an extension member depending from a drive unit and disposed relative to said retaining means for engaging the at least one fastener, and said retaining means including a support member defining a throughbore for slidably accommodating said extension member; and
said extension member having a configuration being dimensioned to engage said retaining means so that upward vertical movement of said extension member will cause said retaining means to also move vertically away from the rail support member.

13. The machine as defined in claim 12 further including carriage means mountable to said machine for moving said applicator relative to a specified one of the railroad track support members.

14. The machine as defined in claim 12 further including control means for controlling the vertical position of said drive means on said machine and also for controlling the rotation of said drive means so that said drive means engages the fastener prior to the rotation of said drive means.

15. The machine as defined in claim 14 wherein said drive means is provided with an axially rotating extension member which rotates in clockwise and counterclockwise directions for driving the fastener onto the support member as well as for releasing the fastener from the support member.

16. The machine as defined in claim 12 wherein said support member includes a bracket for accommodating said at least one gripping member, said bracket defining said throughbore for slidably accommodating said extension member, said extension member being permitted a specified amount of radial deflection by said throughbore for locating the fastener relative to the track support member.

17. The machine as defined in claim 12 further including means on said applicator for releasably connecting said applicator to the machine.

18. The machine as defined in claim 17 further including a tie borer module which is mountable to the machine interchangeably with said applicator.

19. The machine as defined in claim 18 wherein the machine has a first side corresponding to a first rail of the railroad track, and a second side corresponding to a second rail of the railroad track, said first side having one of said applicator and said tie borer module mounted thereto, and said second side having one of said applicator and said tie borer module mounted thereto.

20. An automatic fastener applicator for securing fasteners to rail support members of a railroad track, said support members having predrilled holes for accommodating the fasteners, said applicator comprising:
retaining means for receiving and orienting at least one of the fasteners for application to the track support members;
drive means for automatically engaging at least one of the oriented fasteners, for lowering the engaged fastener to close proximity with a selected rail support member, for locating the fastener into one of the predrilled holes and for rotating the engaged fastener axially for engagement upon the selected rail support member;
said retaining means including at least one gripping member configured to retain the fastener upon engagement by the drive means and as the fastener is axially rotated, and to movably disengage from, and release the fastener as said drive means drives the fastener into the rail support member;

said drive means includes an extension member depending from a drive unit and disposed relative to said retaining means for engaging the at least one fastener, and said retaining means includes a bracket for accommodating said at least one gripping member, said bracket defining a throughbore for slidably accommodating said extension member, said extension member being permitted a specified amount of radial deflection by said throughbore for locating the fastener relative to the track support member; and said extension member has a socket secured at a lower end thereof, said socket being dimensioned to engage said bracket so that upward vertical movement of said extension member will cause said retaining means to also move vertically.

* * * * *